June 14, 1955
E. M. GREER
2,710,630
LOCKING RING FOR LIQUID OUT-LET
PLUG OF PRESSURE ACCUMULATOR
Filed Feb. 9, 1951
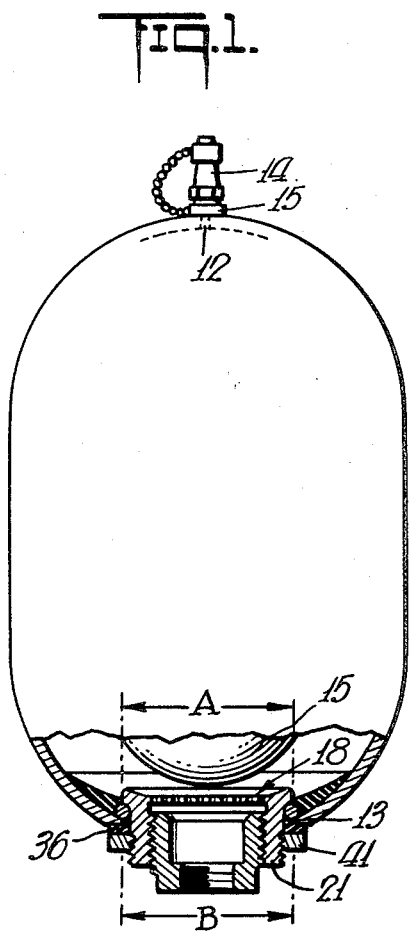
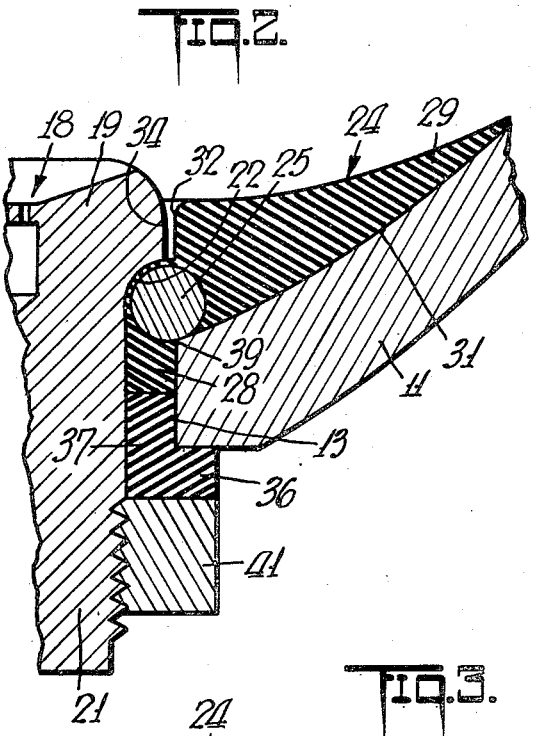
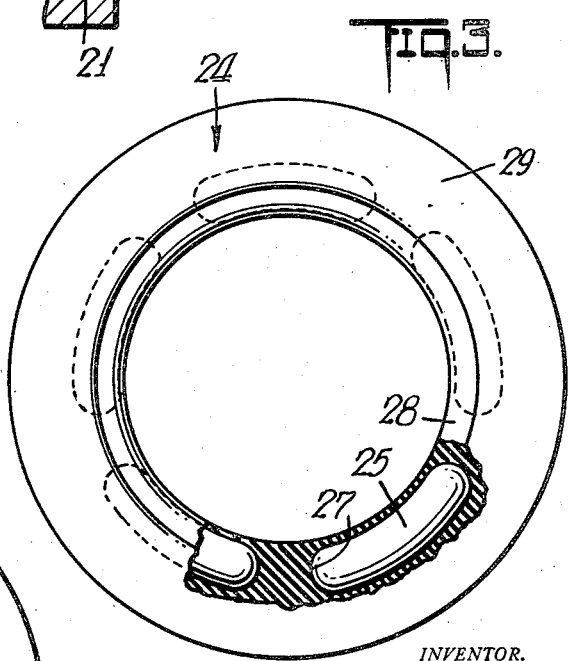
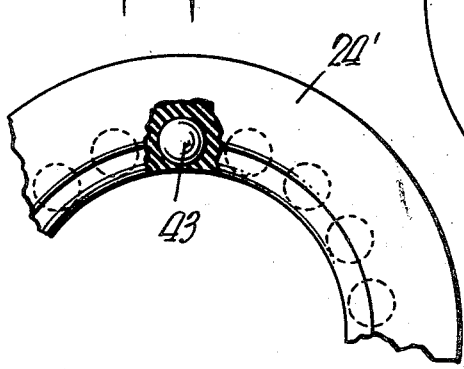
INVENTOR.
Edward M. Greer
BY Dean Fairbank & Hirsch
ATTORNEYS

United States Patent Office 2,710,630
Patented June 14, 1955

2,710,630

LOCKING RING FOR LIQUID OUTLET PLUG OF PRESSURE ACCUMULATOR

Edward M. Greer, West Hempstead, N. Y., assignor to Greer Hydraulics, Inc., a corporation of New York Application February 9, 1951, Serial No. 210,213

7 Claims. (Cl. 138—30)

In pressure accumulators of the type that comprise a rigid shell or container having an air port and a liquid port with an intervening deformable partition, which may be a rubber bag filled with air under pressure through the air port, the liquid port generally has a plug therein by means of which the accumulator may be connected to the liquid source and to the equipment to be operated.

Where the plug is screwed into the liquid port, high pressure operation becomes hazardous, because under such pressure the threads may be sheared off and the plug hurled out like a bullet with likelihood of possibly fatal injury to the operator and of damage to equipment and this may occur in disassembly of the accumulator for maintenance or repair should the mechanic neglect first to release all of the pressure from the inflated bag.

To overcome such difficulties, as substantially shown and described in Patent No. 2,469,171, dated May 3, 1949, a plug may be utilized having a reduced neck forming an enlarged inner end portion defining a shoulder of smaller outside diameter than the liquid port so that it may be inserted therein. A locking member in the form of a ring encompassing the reduced neck portion of the plug, has an outer diameter greater than that of said port and an inner periphery overlapped by the enlarged end portion of the plug and is seated in position intervening between the inner rim of the port and said shoulder. By means of any suitable retaining element such as a nut screwed on the externally threaded neck of the plug which protrudes from the liquid port, the plug may be releasably, yet securely affixed to said shell. As the locking ring is of greater diameter than the liquid port, in order that it may be inserted therethrough into the accumulator shell, it is made deformable as by having portions thereof relatively displaceable. Where to permit such deformation the locking ring is of resilient metal having one or more splits through the circumference thereof, such as the split ring of hardened spring steel shown in the patent above identified, the bag as it expands to expel liquid from the accumulator, will come in contact with the circumference of such ring and especially at high pressures, extrude through such splits, thereby pinching, cutting and destroying the bag.

It is accordingly among the objects of the invention to provide a locking member for the outlet plug of an accumulator which has no splits or discontinuities in its circumference into which the accumulator bag might extrude with resultant injury to or destruction of such bag, yet may readily be deformed for insertion into the liquid port thereof.

According to the invention, the locking member desirably comprises a ring of resilient material such as natural or synthetic rubber or some other suitable plastic which may readily be deformed and is self-restoring to its original shape.

In order to strengthen the resilient locking ring so that it will withstand the shearing action caused by the pressure of the enlarged end of the plug when the bag is bearing thereon, against the inner periphery of the ring and by the pressure of the ring against the rim of the port, a plurality of reaction elements, desirably of hardened metal such as steel, are assembled integral with the ring adjacent its inner periphery and spaced therearound. Desirably the reaction members are substantially circular in cross section and diametrically opposed portions thereof are interposed between the shoulder of the plug and the inner rim of the port securely to retain the plug in such port. As successive rigid reaction elements are spaced about the ring, the intervening resilient segments of the ring permit deforming it for facility of insertion into the liquid port.

According to one embodiment of the invention the reaction elements are segments of a torus, having an inside diameter substantially equal to that of the ring, which provide a substantially long line of contact with the shoulder of the plug and the inner rim of the shell respectively and according to another embodiment of the invention the rigid reaction elements are a plurality of metal balls which afford but a single contact point with the shoulder of the plug and the inner rim of the port respectively.

This application is a continuation in part of co-pending application Serial No. 28,084, filed May 20, 1948.

In the accompanying drawings in which are shown one or more of various possible embodiments of the invention, Fig. 1 is a longitudinal sectional view of an accumulator embodying the invention herein, Fig. 2 is a fragmentary detail view on a greatly enlarged scale of the liquid port of the accumulator, Fig. 3 is a plan view on an enlarged scale of the locking member, and Fig. 4 is a fragmentary view similar to Fig. 3 of another embodiment of the invention.

Referring now to the drawings, the pressure accumulator desirably comprises a pressure resistant vessel, illustratively a rigid shell 11 having opposed ports 12 and 13 therein, one of said ports, illustratively port 12, being of smaller diameter than the other. Desirably the smaller diameter port 12 is provided for the stem (not shown) of a standard pneumatic valve 14 which is affixed to the shell by a nut 15' and the larger diameter port 13, which serves as the liquid port, is formed large enough to pass an accumulator bag 15 therethrough, the latter desirably having the valve 14 molded into one of the ends thereof.

The port 13 desirably has a circular outlet plug 18 positioned therein, having an enlarged inner end 19, the outer diameter "A" of which (indicated in dot and dash lines) is slightly less than the diameter "B" (indicated in dot and dash lines) of the port 13. Plug 18 has a reduced neck portion 21 extending from the head 19 and forming a shoulder 22, desirably curved in cross section, said neck protruding from port 13.

The plug 18 is affixed to shell 11 by a locking member, desirably a ring 24, having an outer diameter greater than the diameter "B" of port 13 and constructed so that it may be inserted into said port 13 to encompass neck 21 of the plug. The locking ring is desirably of resilient material such as natural or synthetic rubber or some other suitable plastic which may readily be deformed and is self restoring to its original shape and has a plurality of rigid reaction elements 25 positioned therearound and assembled integral therewith. Although the reaction elements may be of any suitable type, as shown herein, they are desirably substantially circular in cross section and are positioned adjacent the inner periphery of said ring, preferably being imbedded therein, said ring desirably having a curved inner periphery conforming to the curvature of shoulder 22.

In the embodiment shown in Fig. 3 the reaction elements 25 are desirably segments of a torus having their axes lying on a circle concentric with the ring, the torus from which the segments are formed having an inside diameter substantially equal to that of the ring. Each of the ends of the segments are desirably rounded as at 27 to prevent cutting of the resilient ring when the accumulator is in operation.

Desirably the ring 24 has a substantially cylindrical annular sleeve 28 formed integral therewith on the undersurface thereof and outstanding therefrom at substantially right angles thereto which may be positioned between the outer surface of neck 21 of the plug and the wall of port 13 to substantially fill the space therebetween, thereby to prevent lateral displacement of the plug and also to provide a seal in the manner hereinafter to be described. The ring also desirably has an annular laterally extending flange 29, the undersurface 31 of which is curved so as to conform to the contour of the inner surface of the shell about port 13 for seating of such lateral flange thereon. The upper portion of flange 29 is preferably formed so as to present a substantially cylindrical inner periphery 32, of greater diameter than and coaxial with the inner periphery of said ring, which encompasses the enlarged inner end 19 of said plug and is slightly spaced from the side wall 34 thereof.

Desirably a packing ring 36, also preferably of resilient material such as rubber or the like, encompasses the neck portion 21 of plug 18 protruding from port 13 and has an annular integral sleeve 37 on its inner periphery of thickness that it may pass into the cylindrical space between the neck 21 of the plug and the wall of port 13. With the construction thus described the curved undersurface 31 of the locking ring 24 may be seated on the inner surface of shell 11 about the inner rim 39 of port 13, with shoulder 22 of plug 18 seated on the inner periphery of ring 28 and a nut 41 screwed on the externally threaded protruding portion of neck 21, releasably, yet securely affixes said plug to said shell.

In assembling the accumulator, the bag 15 is passed through the port 13 of the empty shell 11. The valve 14 is pushed out through the port 12 and secured to the shell as by means of nut 15'. The plug 18 is then passed through the port 13 and the locking ring 24 is deformed, as by squeezing diametrically opposed sides thereof together, so that it may be passed through the port into shell 11. The ring 24 is then released and by reason of its resilience, will assume its original shape so that it may readily be passed around the neck portion 21 of the plug. The plug 18 can then be drawn outwardly so that flange 29 may be seat on the inner surface of shell 10 about port 13. In this position the reaction elements 25 will be interposed between the shoulder 22 of the plug 18 and the inner rim 39 of port 13, and the cylindrical sleeve 28 will be positioned between neck 21 and the wall of port 13, with the cylindrical inner periphery 32 of such flange encompassing the enlarged end portion 19 of the plug. The resilient packing ring 36 may then be placed around the neck 21 so that its sleeve 37 will enter the space between the neck and the wall of port 13. The nut 41 is then threaded on the neck 21 and tightened to urge the shoulder 22 of the plug 18 against the reaction elements 25 to press the latter against rim 39 of port 13 and also to move packing ring 36 inwardly so that sleeve 37 and the sleeve 28 of ring 24 are compressed together for lateral expansion of such sleeves thereby to provide a tight seal. The accumulator may then be used in conventional manner.

In the embodiment shown in Fig. 3, in which the reaction elements 25 are segments of a torus, the entire length of diametrically opposed portions of each of the reaction elements will be resting against the shoulder 22 and the rim 39 of port 13 of the shell respectively. Consequently, when the bag 15 has expanded and presses against plug 18, the pressure of the enlarged inner end 19 thereof against each of such segments will be distributed about the periphery thereof and similarly the pressure of the segments on the rim 39 of the port will also be distributed due to the length of the contact area. As a result of such construction the locking member will retain the plug in the shell even with extremely high pressure on the bag.

By reason of the cylindrical periphery 32 of the flange portion of the ring encompassing the enlarged inner end 19 of the plug, as the bag used in such accumulator expands and contracts the upper surface of such flange portion 29, it will compress the latter, thereby moving its periphery 32 against the side wall 34 of the enlarged end 19 of the plug snugly to hug the latter, so that there will be no likelihood of the bag extruding between the shoulder 22 and the inner periphery of the ring which might cause cutting of such bag and possible destruction thereof.

With the construction of the deformable locking member above described, as the entire upper surface thereof contacted by the bag in expansion thereof is of a single uninterrupted length, there are no spaces or discontinuities therein into which the bag might extrude. As a result, there is no likelihood of pinching and destroying the bag.

As in disassembling the accumulator it is necessary first to push the plug 18 inwardly so that the ring 24 may be slipped off the neck 21 of the plug and deformed for removal through port 13, if there is any air pressure in the bag the latter will press against such plug 18 and prevent displacement thereof.

It is apparent therefore that in disassembly of the accumulator a mechanic can not neglect first to release all of the air pressure remaining in the bag and consequently there is no danger of injury as a result of the plug being blown out of the shell, and by reason of the fact that plug 18 is retained in place by the coaction of shoulder 22 with locking ring 24, there is no strain on the coacting threads of the plug and the nut 41 and hence there is no likelihood of stripping of such threads.

The embodiment of the locking ring shown in Fig. 4 is substantially identical with that shown in Figs. 1 to 3 and corresponding parts have the same reference numerals primed. In this embodiment the reinforcing elements are metal balls 43 preferably of hardened steel, the centers of which lie on a circle concentric with the ring 24' and are spaced along and preferably embedded in the inner periphery of ring 24'.

Although such construction is adequate for many accumulators, it is not to be recommended for high pressure type accumulators for when the inflated bag expands against the enlarged inner end 19 of plug 18, the shoulder 22 will be pressed against but a single point on each of the balls 43 and but a single point of each of the balls will also press against the inner rim 39 of port 13. Consequently with high pressure in the bag, the point contacts of the balls may act as a cutting edge to form notches in the shoulder 22 of the plug and the rim 39 of port 13 with resultant destruction of the shell and the plug and possible forceful ejection of such plug from the shell.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. An accumulator comprising a shell having two ports, a deformable partition secured within said shell and intervening between said ports, a plug in one of said ports and having an enlarged inner end defining a shoulder, the largest diameter of said plug being less than the diameter of said port, a locking member encompassing said plug and having an outer diameter greater than that of said port and an inner periphery overlapped by said shoulder and seated in position intervening between said port and said shoulder, said locking member comprising a deformable ring having a plurality of rigid reaction elements spaced therearound, completely embedded therein and assembled therewith adjacent the inner periphery thereof, said elements being interposed between said shoulder and the rim of said port, said locking member having portions thereof relatively displaceable to permit of introduction into the port and seating thereof in said shell and means releasably to secure the plug to said shell.

2. The combination set forth in claim 1 in which said rigid reaction elements are segments of a torus of hardened metal having an inner diameter substantially equal to that of the ring and having their axes on a circle concentric with the ring.

3. The combination set forth in claim 1 in which said rigid reaction elements are hardened metal balls having their centers on a circle concentric with the ring.

4. The combination set forth in claim 1 in which said plug has a reduced neck portion protruding from the associated port, and said ring has an annular sleeve on its underface interposed between said neck portion and the adjacent wall of said port and an annular flange portion extending laterally outward therefrom, said flange having a curved undersurface seated on the inner wall of said shell adjacent said port.

5. As an article of manufacture, a locking member comprising a ring of deformable resilient material self-restoring to substantially its original shape, having a plurality of rigid reaction elements spaced therearound, completely imbedded therein and assembled therewith adjacent the inner periphery thereof, whereby portions of said locking ring are relatively displaceable, said elements comprising segments of a torus of hardened metal having an inner diameter substantially equal to that of the ring and having their axes on a circle concentric with the ring, said ring having an annular flange portion extending laterally outwardly therefrom, said flange portion having a cylindrical inner periphery of greater diameter than that of the inner periphery of said ring and coaxial therewith.

6. As an article of manufacture, a locking member comprising a ring of deformable resilient material, self-restoring to substantially its original shape, having a plurality of rigid reaction elements spaced therearound, completely embedded therein and mounted adjacent the inner periphery thereof, whereby portions of said locking ring are relatively displaceable, said elements comprising segments of a torus of hardened metal having an inner diameter substantially equal to that of the ring and having their axes on a circle concentric with the ring, said ring having an annular cylindrical sleeve integral therewith and outstanding from the undersurface thereof at right angles thereto on the inner periphery thereof and an annular flange portion extending laterally outward therefrom, said flange portion having a cylindrical inner periphery of greater diameter than that of the inner periphery of said ring and coaxial therewith.

7. As an article of manufacture, a locking member comprising a ring of deformable resilient material self-restoring to substantially its original shape, having a plurality of balls of hardened metal spaced therearound, completely embedded therein and assembled therewith adjacent the inner periphery thereof and having their centers on a circle concentric with the ring, whereby portions of said locking member are relatively displaceable.

References Cited in the file of this patent

UNITED STATES PATENTS

| Number | Name | Date |
| --- | --- | --- |
| 870,428 | Graham | Nov. 5, 1907 |
| 1,072,793 | Torkington | Sept. 9, 1913 |
| 1,967,985 | Wolcott | July 24, 1934 |
| 2,469,171 | Mercier et al. | May 3, 1949 |
| 2,505,766 | Guy | May 2, 1950 |